(12) United States Patent
Franke et al.

(10) Patent No.: US 9,319,420 B1
(45) Date of Patent: Apr. 19, 2016

(54) CYBER INTELLIGENCE CLEARINGHOUSE

(75) Inventors: Don Franke, San Antonio, TX (US); Peter Babcock, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 77 days.

(21) Appl. No.: 13/492,396

(22) Filed: Jun. 8, 2012

Related U.S. Application Data (60) Provisional application No. 61/494,764, filed on Jun. 8, 2011.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |
| *G06F 21/55* | (2013.01) |

(52) U.S. Cl.
CPC .......... *H04L 63/1416* (2013.01); *G06F 21/554* (2013.01)

(58) Field of Classification Search
USPC ...................................... 726/22–25
See application file for complete search history.

(56) References Cited

U.S. PATENT DOCUMENTS

| | | | | |
|---|---|---|---|---|
| 6,742,128 B1* | 5/2004 | Joiner | ............................... | 726/25 |
| 7,093,292 B1 | 8/2006 | Pantuso | | |
| 7,600,258 B2 | 10/2009 | Desouza et al. | | |
| 7,647,645 B2* | 1/2010 | Edeki et al. | ...................... | 726/28 |
| 7,761,912 B2* | 7/2010 | Yee et al. | ........................... | 726/11 |
| 7,954,158 B2* | 5/2011 | Denton | ............................... | 726/23 |
| 8,214,497 B2* | 7/2012 | Alperovitch et al. | .......... | 709/226 |
| 8,234,706 B2* | 7/2012 | Zhang et al. | ..................... | 726/22 |
| 8,443,449 B1* | 5/2013 | Fan et al. | ......................... | 726/24 |
| 8,554,601 B1* | 10/2013 | Marsh | ..................... | G06Q 30/02 705/7.32 |
| 8,689,335 B2* | 4/2014 | Helman et al. | .................... | 726/25 |
| 8,800,030 B2* | 8/2014 | Seshadri et al. | ................. | 726/22 |
| 2005/0223076 A1* | 10/2005 | Barrus et al. | .................... | 709/207 |
| 2008/0263669 A1* | 10/2008 | Alme | ................................ | 726/24 |
| 2009/0013041 A1* | 1/2009 | Farmer et al. | .................. | 709/204 |
| 2009/0300720 A1 | 12/2009 | Guo et al. | | |
| 2010/0251371 A1 | 9/2010 | Brown | | |
| 2010/0269175 A1* | 10/2010 | Stolfo et al. | ..................... | 726/22 |
| 2011/0047594 A1* | 2/2011 | Mahaffey et al. | .................. | 726/1 |

(Continued)

OTHER PUBLICATIONS

Scenario Graphs and Attack Graphs Oleg Mikhail Sheyner CMU-CS-04-122 Apr. 14, 2004.*

(Continued)

*Primary Examiner* — Dede Zecher
*Assistant Examiner* — Vadim Savenkov
(74) *Attorney, Agent, or Firm* — Fish & Richardson P.C.

(57) ABSTRACT

Systems, methods, and computer-readable and executable instructions are provided for providing a cyber intelligence clearinghouse (CIC). Providing a CIC can include generating analysis data from intelligence information collected from a number of sources. In addition, providing a CIC can include calculating a number of fidelity scores from the analysis data, wherein the number of fidelity scores represent a trustworthiness of the number of sources. In addition, providing a CIC can include determining a number of events to block based on the number of fidelity scores. Furthermore, providing a CIC can include providing feedback data to the number of sources based on the number of fidelity scores and the number of events to block.

20 Claims, 4 Drawing Sheets

(56) References Cited

U.S. PATENT DOCUMENTS

2011/0131644 A1  6/2011  Keanini et al.
2012/0017281 A1* 1/2012  Banerjee .............. G06F 21/00
                                              726/25
2012/0137367 A1* 5/2012  Dupont et al. ............... 726/25

OTHER PUBLICATIONS

Alata et al. "CADHo: Collection and Analysis of Data from Honeypots" [online]. Apr. 20-25, 2005. [retrieved on Nov. 6, 2011] Retrieved from the Internet<URL: www.eurecom.fr/util/publidownload.en.htm?id=1626> 4 pages.

DiProfio. "Distributed Security Management for the Enterprise." [online] Jan. 3, 2002. [retrieved on Dec. 6, 2011] [Retrieved from the Internet<URL: http://www.sans.org/reading_room/whitepapers/commerical/distributed-security-management-enterprise_783> 12 pages.

Holz. "Learning More About Attack Patterns With Honeypots." [online] 2006. [retrieved on Dec. 6, 2011] Retrieved from the Internet<URL: citeseerx.ist.psu.edu/viewdoc/download?doi=10.1.1.83.6039.pdf> 15 pages.

\* cited by examiner

CYBER INTELLIGENCE CLEARINGHOUSE

TECHNICAL FIELD

The present disclosure relates to devices, systems, and methods for providing a cyber intelligence clearinghouse.

BACKGROUND

There are many tools that can be used to combat malicious threats against a computing system. However, many of these tools are created by separate developers and, therefore, although a tool may be great at detection in its own right, the information is isolated with respect to other intelligence gathering efforts being accomplished by other intelligence gathering tools on the system. In some instances, this can result in redundant activities being done by multiple tools and/or contradictory results, among other issues.

DETAILED DESCRIPTION

The present disclosure provides a cyber intelligence clearinghouse (CIC) that can be used to integrate, share, and/or compare information from multiple sources (e.g., intelligence sources, intelligence gathering tools, contributors, etc.). This can provide a more robust and/or more reliable intelligence resource than could be accomplished through use of multiple intelligence gathering tools utilized separately.

Figure 1:
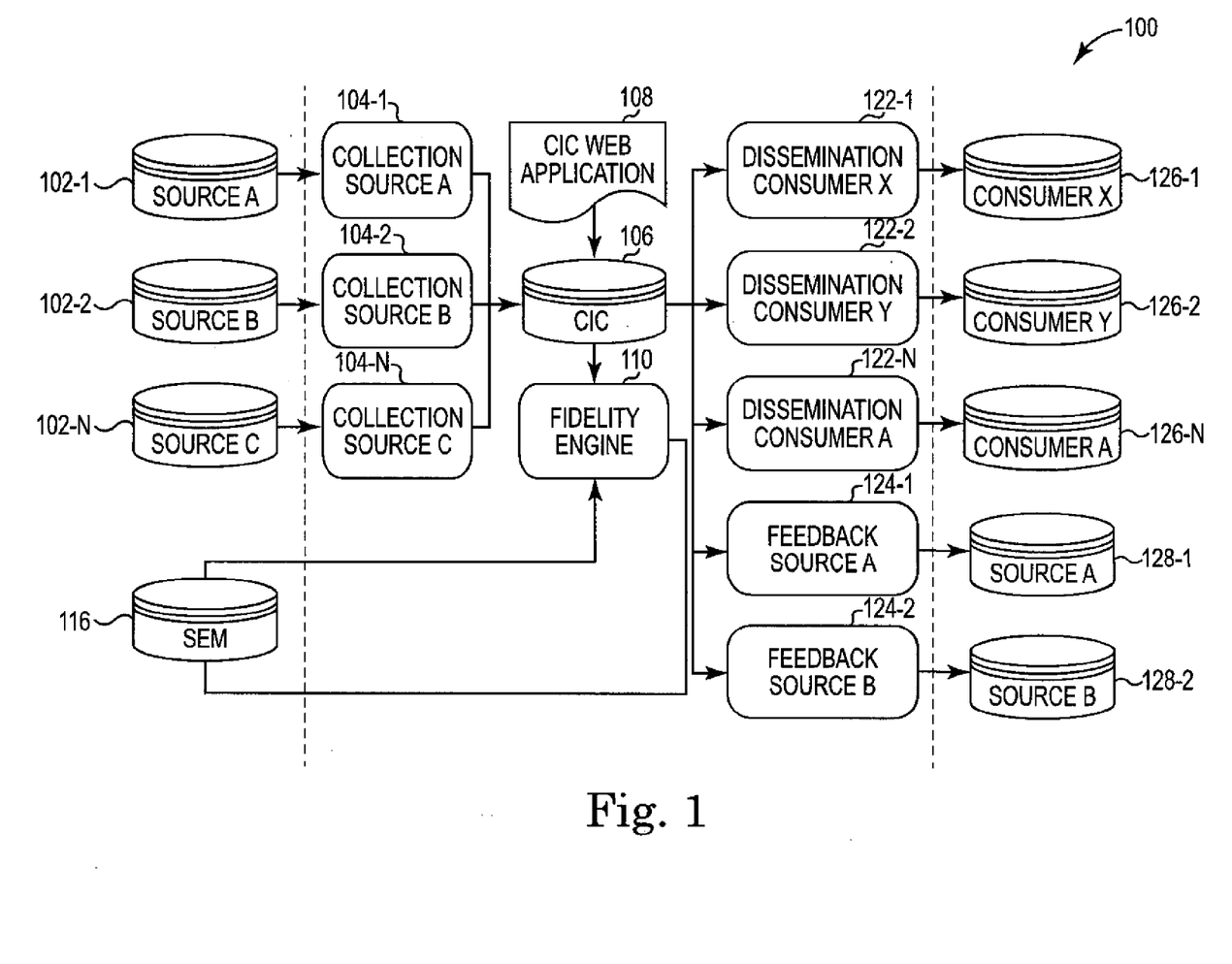
FIG. 1 illustrates an embodiment of an intelligence information structure according to the present disclosure.

FIG. 1 illustrates an embodiment of an intelligence information structure 100 according to the present disclosure. The CIC 106 can receive various intelligence information (e.g., security event data, security event data logs, tips, etc.). The intelligence information can be received in a variety of formats (e.g., security event data logs, emails, automated intelligence, etc.).

The intelligence information can be received from a variety of contributors and/or sources 102-1, 102-2, . . . , 102-N (e.g., government, industry, commercial, open source, etc.). Each of the variety of sources 102-1, 102-2, . . . , 102-N can provide intelligence information to a number of corresponding collection sources 104-1, 104-2, . . . , 104-N. The number of collection sources 104-1, 104-2, . . . , 104-N can be a computing device (e.g., server, database, etc.) that can receive the intelligence from the sources 102-1, 102-2, . . . , 102-N and transfer the intelligence information to the CIC 106. The number of collection sources 104-1, 104-2, . . . , 104-N can also include a number of desired functions to filter the received intelligence information.

In some embodiments, the CIC 106 can be provided to include a system that facilitates the ability for an intelligence gathering computing device or system to receive and/or parse disparate intelligence feeds (e.g., from government, industry, commercial, open source, and/or other sources). For example, the CIC 106 in a modular fashion, can receive and/or parse disparate intelligence feeds from multiple sources 102-1, 102-2, . . . , 102-N and consolidate the results into a centralized database of the CIC 106.

In some embodiments, the CIC 106 can augment the intelligence gathering efforts of these individual intelligence gathering tools with additional or alternative information. For example, in some embodiments, findings from one or more reputation tools (e.g., for IP address and/or domain reputation analysis, etc.) can be provided. Reputation tools can include intelligence resources (e.g., provided by computing device executable instructions on and/or associated with the CIC 106 and/or other resources, such as those available via one or more networks, such as the Internet). The reputation tools can provide a reputation rating for the resource that an item of intelligence information came from. In some embodiments, the quantity of domains hosted at an IP address can be provided to the CIC 106 and/or analyzed thereby.

The intelligence information can be cross-referenced and searchable by a CIC web application 108. For example, as new threats are identified and received by the CIC 106, the new threats can be accessed as needed. For example, the CIC web application 108 can allow an intelligence gathering professional (e.g., person designated to determine quality of intelligence, computing device, user, etc.) to quickly ascertain to what extent an item of information should be relied upon (e.g., relied upon without confirmation, relied upon in the short term but with confirmation from one or more other resources, not relied upon until confirmed by one or more other resources, etc.)

In some embodiments, the CIC 106 can allow for automated and/or manual extraction and/or formatting of the intelligence information into various data formats for delivery to multiple destinations, including other intelligence tools, external third parties, the number of sources 122-1, 122-2, . . . , 122-N, and other intelligence personnel.

The CIC 106 can format the intelligence information for extraction to a number of internal and/or external tools for analysis (e.g., Security Event Management (SEM) tool 116, etc.). For example, the CIC 106 can parse intelligence information into a common format. In another example, the CIC 106 can add context (e.g., Internet Protocol (IP) reputation, domain reputation, quantity of domains hosted at an IP address, etc.) to the intelligence information. A fidelity engine 110 can be utilized by the CIC 106 to transmit and/or extract intelligence information to a, SEM tool 116.

The SEM tool 116 can be utilized to search for particular instances of intelligence data (e.g., particular security events, etc.) within various intelligence data received from the number of sources 102-1, 102-2, . . . , 102-N. For example, intelligence data received from the number of sources 102-1, 102-2, . . . , 102-N can be transmitted by the fidelity engine 110 to the SEM tool 116 for analysis. The SEM tool 116 can analyze the intelligence data and return SEM data to the fidelity engine 110 for analysis.

The fidelity engine 110 can generate analysis data from the received SEM data. The analysis data generated by the fidelity engine 110 can include event fidelity information and source fidelity information. The fidelity engine 110 can calculate a fidelity score for each security threat event within the received SEM data and/or received intelligence information from the number of sources 102-1, 102-2, . . . , 102-N, as described further herein (e.g., FIG. 2).

The external tools (e.g., SEM tool 116, etc.) can be utilized to determine identity information including a number of references to a malicious person or an actor responsible for the number of security events within the intelligence information. In some embodiments, the intelligence information can be utilized to identify who the source of a threat is and, in some cases will be (e.g., based on past behavior) and/or where an attack may come from and/or how it will come. For example, if an actor registers domains with a particular set of names (e.g., characters from a particular movie) or other identifiable pattern, the CIC 106 system can provide functionality to analyze and/or identify such patterns or other suitable characteristics of a source. Such information can then be stored and analyzed to better precision prevention and/or proactive measures that can be taken against such sources.

The external tools and/or the CIC 106 can utilize the identity information from the intelligence information to search for additional malicious domains and/or other intelligence information as they are being registered on a network (e.g., wide area network (WAN), Internet, etc.). For example, the identity information can be utilized to determine an identity pattern of an actor. The identity pattern can be used to identify other domains that may be malicious (e.g., a security threat, etc.).

The CIC 106 can receive reporting and/or metrics surrounding the vitality and/or viability of the number of sources 102-1, 102-2, ..., 102-N. For example, the CIC 106 can utilize the fidelity engine 110 to analyze information regarding a source fidelity (e.g., trustworthiness of the source, etc.) of the number of sources 102-1, 102-2, ..., 102-N. The information utilized to analyze and determine the source fidelity can include, but is not limited to: an amount of time the source has been sending intelligence information, a history of reported security threat events, and/or a number of the reported security threat events that were analyzed and confirmed to be actual threats (e.g., malicious events, security threat events with a particular fidelity, etc.).

The number of confirmed security threat events and the number of reported security threat events can be used to calculate a percentage of confirmed security threat events and can be one of the factors for calculating the source fidelity. The number of confirmed security threat events can include a number of security threat events within the received intelligence information that includes an analyzed event fidelity that is above a predetermined threshold.

The CIC 106 can share intelligence information and/or analysis data with a number of consumers 126-1, 126-2, 126-N (e.g., institutions, intelligence sources, analysts, etc.). For example, the CIC 106 can provide the number of consumers 126-1, 126-2, 126-N with analysis data that was determined by the fidelity engine 110. The CIC 106 can utilize a dissemination process for each of the number of consumers 126-1, 126-2, 126-N. For example, each of the number of consumers 126-1, 126-2, 126-N can have a corresponding preference data orientation (e.g., dissemination consumer database, dissemination consumer data orientations, etc.) that can be provided by the CIC 106. The dissemination consumer data orientations 122-1, 122-2, ..., 122-N can correspond to a number of consumers 126-1, 126-2, ..., 126-N. Each dissemination consumer data orientations 122-1, 122-2, ..., 122-N can include a data type, data format, organization of data, and/or specific type of intelligence information requested by the number of consumers 126-1, 126-2, ..., 126-N.

Each of the number of consumers 126-1, 126-2, ..., 126-N can request a different dissemination consumer data orientations 122-1, 122-2, ..., 122-N based on the consumers system and/or intelligence information concerns. For example, one of the number of consumers 126-1, 126-2, ..., 126-N may use a system that only recognizes a particular data format. In this example, the CIC 106 can reformat the dissemination consumer data orientation (e.g., 122-1, etc.) to the particular data format. The number of consumers 126-1, 126-2, ..., 126-N can also include one or more of the number of sources 102-1, 102-2, ..., 102-N. For example, a dissemination consumer data orientation (e.g., 122-N) can be provided to a consumer (e.g., 126-N) that is also a source (e.g., 102-1).

The CIC 106 can determine source feedback 124-1, 124-2 for each of the number of sources 102-1, 102-2, ..., 102-N. The source feedback 124-1, 124-2 can include a number of requests by the CIC 106 and/or requests from a user. The source feedback 124-1, 124-2 can include: a request for a different file format, additional information regarding one of the number of sources 102-1, 102-2, ..., 102-N, a notification that one of the number of sources 102-1, 102-2, ..., 102-N has become compromised, a notification of satisfactory intelligence information, event fidelity scores, source fidelity scores, where gaps in their data exist and recommendations for filling those gaps and/or suggestions on change in presentation of items of intelligence, etc.

In one example of providing feedback to the number of sources 102-1, 102-2, ..., 102-N, the CIC 106 can determine that the fidelity of the intelligence information for a particular source (e.g., 102-1, 102-2, ..., 102-N) is below a predetermined threshold. In this example, the CIC 106 can send feedback to the particular source that notifies the particular source of the fidelity score of the intelligence information provided. The feedback from the previous example can be utilized by the source to determine if there is a problem with the source's system (e.g., source has become compromised, etc.).

The feedback can provide the number of sources 102-1, 102-2, ..., 102-N with an indication of how valuable and/or accurate the intelligence information is to the CIC 106 and/or CIC operator. The feedback can also provide the number of sources 102-1, 102-2, ..., 102-N with additional information regarding the intelligence information. For example, the number of sources 102-1, 102-2, ..., 102-N can determine if other entities are experiencing similar security threat events or if the security threat events that were provided within the intelligence information are unique to the number of sources 102-1, 102-2, ..., 102-N.

In some embodiments, the CIC 106 can execute one or more feedback loops with regard to the intelligence information and/or analysis data. For example, an item of intelligence from one source (e.g., the number of sources 102-1, 102-2, ..., 102-N) can be cross-analyzed against one or more other sources and/or reputation sources, (e.g., run against a malware sandbox and/or other utility), fed to the SEM 116 and/or sending any SEM match events right back to the CIC 106 for further analysis and/or comparison. Feedback loops can reinforce and/or enhance each item of intelligence (e.g., by its relation with another item or its non-relation thereto).

In some embodiments, the intelligence information can be used by the CIC 106 to determine where to block a particular threat (e.g., history of other threats by a particular threat source, information regarding other similar types of threats and block strategy successes, etc.). For example, the CIC 106 can determine that a particular security threat event within the intelligence information can be blocked via the IP address. In another example, the CIC 106 can determine that a particular domain can be blocked.

In some embodiments, the intelligence information can provide information that may extend beyond the system's maximum retention threshold. The CIC 106 can provide timeline information and/or other analysis data for the received intelligence information for longer periods of time compared to other system data (e.g., specific security threat event data, etc.). For example, events based on a particular threat may no longer be received, but analysis of events regarding the threat and/or an item of intelligence may be available through recursive analysis.

In various embodiments, a collection and/or analysis timeline can be created relating to an item of intelligence and/or regarding a threat source (e.g., actor, etc.), among other suitable subjects of such timelines. The timeline can be utilized by the CIC 106 to further determine patterns of the threat source and/or particular security threat events. The timeline can be generated from the analysis of the fidelity engine 110 and/or SEM 116. The timeline can be stored within the CIC 106 for a longer period of time compared to the intelligence information and/or security threat event data. The timeline can be generated in order to keep a record of analysis without having to store analysis data.

Figure 2:
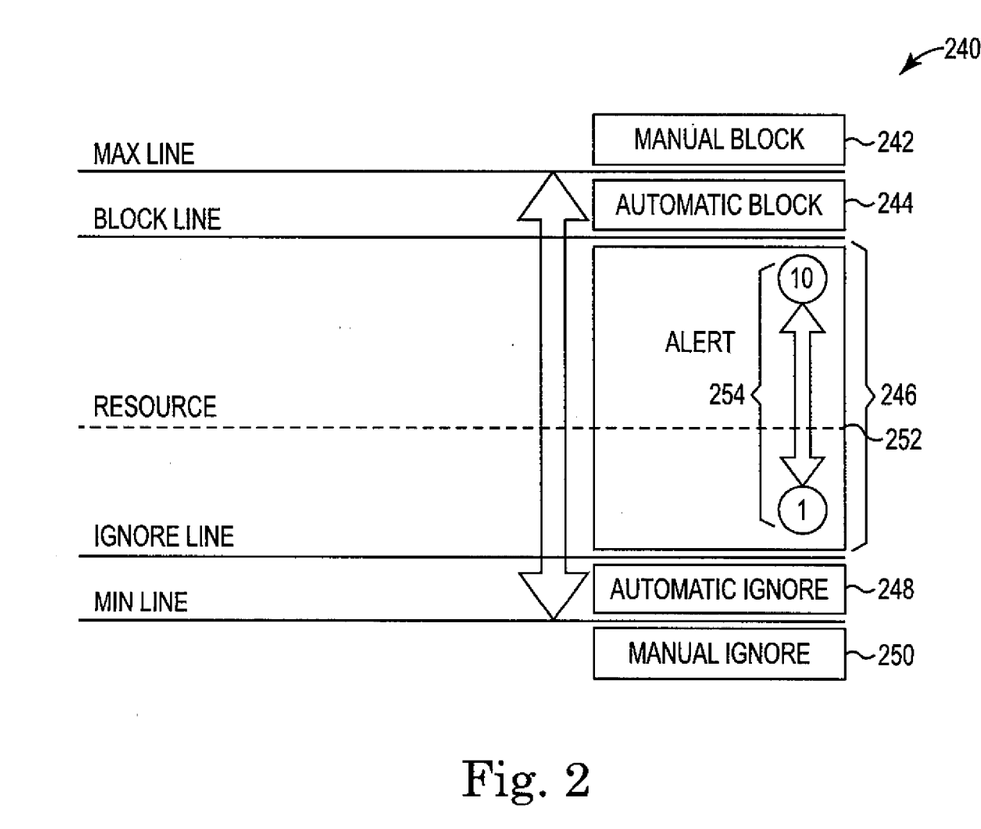
FIG. 2 illustrates an embodiment of an intelligence information fidelity scoring structure according to the present disclosure.

FIG. 2 illustrates an embodiment of an intelligence information fidelity scoring structure 240 according to the present disclosure. The fidelity scoring structure 240 can be utilized by a fidelity engine (e.g., fidelity engine 110 described in reference to FIG. 1) to determine an event fidelity (e.g., trustworthiness of a security threat event, trustworthiness of a particular piece of intelligence information, etc.) and/or a source fidelity (e.g., trustworthiness of a source).

The fidelity scoring structure 240 can include a separate section of manual block 242 and manual ignore 250. The manual block 242 can include a manual override of the fidelity scoring structure 240 by a user (e.g., administrator, analyst, etc.). For example, if a particular piece of intelligence information is received by a CIC, a user can utilize a manual block 242 function to block security threat events within the particular piece of intelligence information regardless of the fidelity score that is assigned to the particular piece of intelligence information. The manual ignore 250 can include a manual override of the fidelity scoring structure 240 by a user regardless of the fidelity score. The manual ignore 250 function can operate similar to the manual block function except that the intelligence information can be manually ignored regardless of the determined fidelity score.

The fidelity scoring structure 240 can include an automatic block line 244 and an automatic ignore line 248. The automatic block line 244 and the automatic ignore line 248 can each act as a predetermined threshold. For example, if the fidelity score results in a value greater than the predetermined threshold of the automatic block line 244, then the security threat event associated with the intelligence information can be automatically blocked without further review from a user. In another example, if the fidelity score results in a value lower than the predetermined threshold of the automatic ignore line 248, then the intelligence information can be automatically ignored without further review from a user.

The fidelity score results and/or intelligence information can be confirmed by a fidelity confirmation. The fidelity confirmation can include utilizing a corresponding link (e.g., uniform resource identifiers, etc.) to identify if the uniform resource identifier is a malicious security threat event (e.g., virus, etc.). Certain types of intelligence, such as URLs, can in various embodiments, be processed (e.g., automatically) and/or enhanced by security controls such as, for example, the FireEye® Malware Sandbox in order to provide fidelity confirmation functionality before an automatic block action and/or an automatic ignore action will take place.

The fidelity scoring structure 240 can include an alert area 246 between the automatic block line 244 and the automatic ignore line 248. The alert area 246 can be an area that includes fidelity scores that can result in an alert being sent to a user, a number of sources, and/or a number of consumers. The alert can be sub-tiered based on the fidelity score. For example, a fidelity score that is closer to the block line 244 can be an alert to a greater number of users compared to a fidelity score that is closer to the ignore line 248.

The alert area 246 can use a fidelity scoring scale 254. For example, the fidelity scoring scale 254 can include a range of alert levels such as 1-10 to describe a low threat or a high threat. For example, a 1 can be used in the fidelity scoring scale to indicate that the intelligence information has a relatively low threat level. In another example, an 8 can be used in the fidelity scoring scale to indicate that the intelligence information has a relatively high threat level. The type of alert can be determined based on the threat level of a particular piece of intelligence information (e.g., sub-tiered, etc.). For example, the type of alert for a threat level that is relatively high can be directed to a wider range of users (e.g., all users). In contrast, the type of alert for a threat level that is relatively low can be directed to a smaller ranger of users (e.g., administrator, analyst, etc.).

The values for the fidelity score (e.g., event fidelity score, source fidelity score) can be based on a number of factors. The factors can be different for the event fidelity score and for the source fidelity score. For example, the event fidelity score can include factors such as: type of intelligence information (e.g., IP address, hostname, URL, etc.), quantity of information, confirmation of intelligence information (e.g., URL confirmation, etc.), source of intelligence information, etc. The type of intelligence information can include a specific uniform resource locator for the suspected security threat event, a domain name, etc. In another example, the source fidelity score can include factors such as: percent of confirmed security events, length of time providing intelligence, reputation data, etc.

In various embodiments, the CIC can provide a calculating functionality for calculating the fidelity of the intelligence and/or the source of the item of intelligence. For example, in some embodiments, a fidelity score can be made up of multiple component scores, including but not limited to, the fidelity of the source (e.g., contributor), the type of intelligence (e.g., IP Address, hostname, URL, etc.), reputation augmentation information, and/or individual analyst (e.g., user) scorings of a specific item of intelligence.

The fidelity scoring functionality can populate a combined fidelity score for a specific item of intelligence. This score can, for example, be compared against one or more thresholds and can be denoted, for example, as the automatic block 244 (e.g., that will be blocked by another security control such as Network IPS, Firewall, etc.), an alert 248, or an ignore action 248, among other suitable threshold structures that could be utilized with embodiments of the present disclosure.

In some embodiments, source information can be collected and/or analyzed regarding the number of items of intelligence a particular source (e.g., 102-1, 102-2, . . . , 102-N described in FIG. 1) provides during a particular period and/or total items contributed. The source information can, for example, be used to analyze the trustworthiness of the items being contributed (e.g., 14/100 items were deemed trustworthy). This information can be present, for example, based on thresholds to allow for a user to quickly make an assumption of trustworthiness of an item of intelligence based on the source of the item of intelligence.

In some embodiments, the CIC can determine a block effectiveness for security threat events that are indicated as automatic block 244 and/or result in a fidelity score that results in a block. For example, the CIC can validate that a number of security threat events that are indicated as automatic block 244 are actually blocked by a security application (e.g., Virus Protection Software, Antivirus Software, Firewall, etc.).

Beyond the fidelity scoring and association with source of intelligence information to the CIC system, some intelligence, such as domain information, can be associated with email addresses, phone numbers, and/or physical addresses. This information may be fake (e.g., not the actual information for the malicious actor) for malicious domains, but it may provide some relevant information that can be utilized in threat prevention and other functionalities of the CIC system. For example, the domain information can be analyzed to determine a pattern (e.g., pattern of using information relating to movie characters and/or actors, etc.). The pattern of information supplied to identify an actor can be used to predict other domain names that may be malicious domains from the same actor.

In various embodiments, the CIC can provide a mind map type visual interface to denote one or more data linkages in a manner in which the user (e.g., administrator, analysis, etc.) can see the current links and/or create hypothetical link scenarios by which to test the outcome of possible combinations without modifying the data for other analysts.

The mind map type visual interface can be beneficial in identifying possible links between information in which there are not presently tangible links but where an intelligence gathering professional can work through different potential links. For example, the intelligence gathering professional and/or CIC can identify if any of these possible links may warrant additional investigation or monitoring, among other benefits of such system functionality. In some embodiments, the user interactivity can be accomplished via a web application (e.g., CIC web application 108 described in FIG. 1) user interface or other suitable type of user interface.

Figure 3:
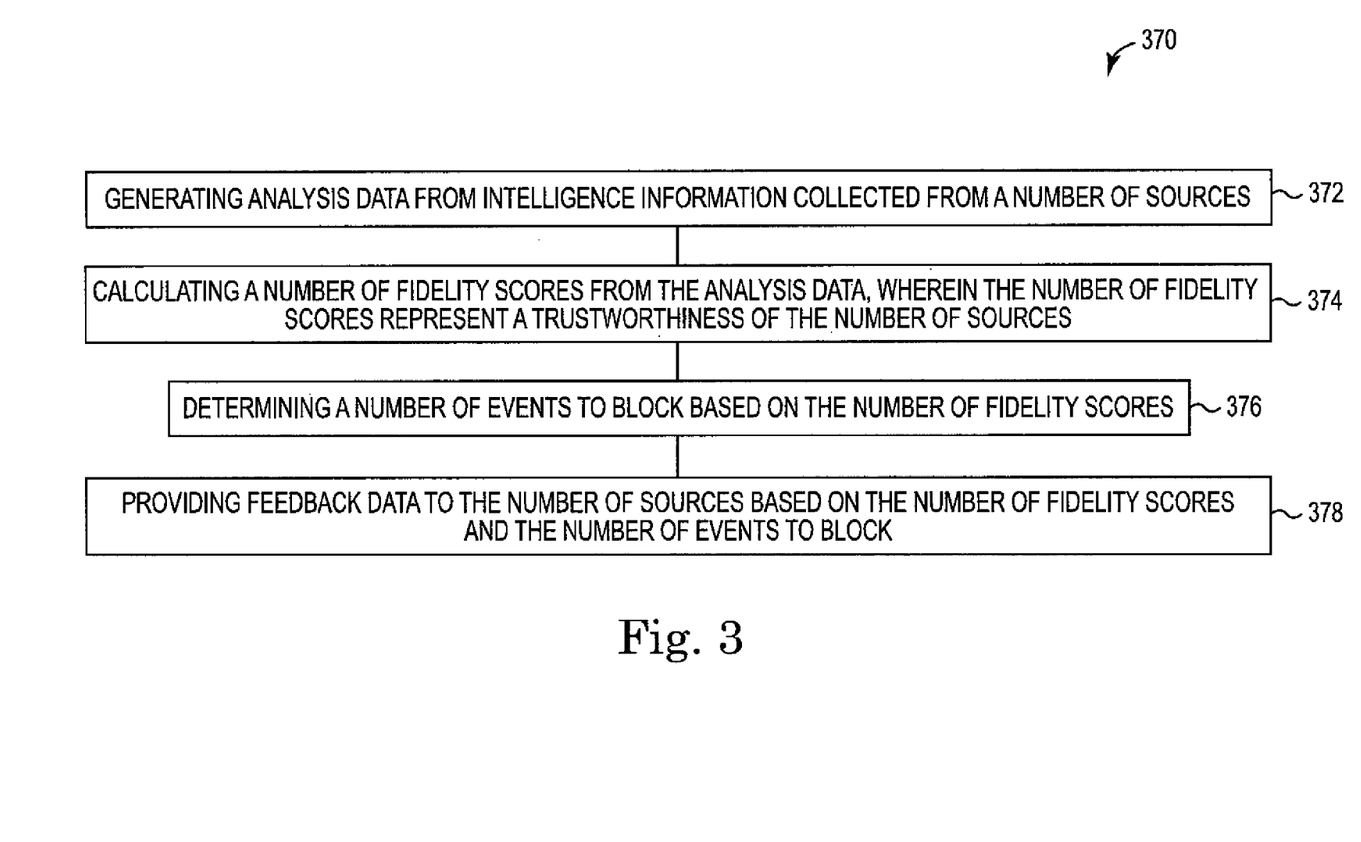
FIG. 3 illustrates a flow diagram of an example method for implementing a cyber intelligence clearinghouse according to the present disclosure.

FIG. 3 illustrates a flow diagram of an example method 370 for providing a cyber intelligence clearinghouse (CIC) according to the present disclosure.

At 372 analysis data is generated from intelligence information collected from a number of sources (e.g., 102-1, 102-2, . . . , 102-N described in FIG. 1). The intelligence information can include a description and/or type (e.g., IP address, domain name, host name, URL, etc.) of a number of security threat events. The analysis data can be generated by a number of internal and/or external tools (e.g., SEM, fidelity engine, CIC web application, the CIC engine 106, etc.).

At 374 a number of fidelity scores are calculated from the analysis data. The number of fidelity scores can be calculated utilizing a CIC engine as described herein. The number of fidelity scores can include event fidelity scores, source fidelity score, and/or combinations of multiple fidelity scores to determine an overall fidelity score.

At 376 a number of events to block are determined based on the number of fidelity scores. As described herein, the fidelity score can be utilized to determine a number of security threat events that are automatically blocked. The security threat event can be in an automatic block category and blocked by a security application when the fidelity score is above a predetermined threshold.

In some embodiments, a fidelity confirmation can be executed prior to a security threat event being blocked by the security application. For example, if the fidelity score is above the predetermined threshold, the fidelity confirmation can be executed to create a test of the security threat event. The test of the security threat event can include utilizing a mind map visual interface to test a number of hypothetical links without modifying the data from the security threat event.

At 378 feedback data is provided to the number of sources based on the number of fidelity scores and the number of events determined to block. Feedback data can be generated by the CIC to deliver to the number of sources. The feedback data can be based on the format of the intelligence information. For example, the feedback can relate to the format (e.g., organization, event data logs, extensible markup language (XML), portable document format (PDF), etc.) that the source sends the intelligence information to the CIC.

The feedback data can include the fidelity scores that corresponds to the intelligence information sent by a particular source. For example, feedback including an event fidelity score can be sent to a source A for intelligence information that was sent by source A. In another example, feedback including a source fidelity score calculated based on intelligence information received from source A can be sent to source A.

The feedback information can be valuable to the number of sources for a variety of reasons. The fidelity score information from the feedback information can notify a source on how reliable the intelligence information is for the operator of the CIC (e.g., how many events were seen in this environment, event fidelity score, source fidelity score, etc.). The source can use the feedback information to determine a magnitude of institutions being attacked by security threat events within the intelligence information. For example, a particular source A can be a financial institution and the operator of the CIC can be an educational institution. In this example, the particular source A can be notified if the intelligence information they are provided are directed to multiple institutions or to educational institutions only.

The feedback information can provide a source with information about how specific the security threat events with the intelligence information are to the source. For example, if a particular source A is a financial institution and the operator of the CIC is also a financial institution, the source can use the feedback information to determine if the security threat events are directed specifically to the source and/or to all financial institutions.

The feedback information can include any information that is determined to be valuable in developing the relationship between the number of sources and the operator of the CIC. A number of feedback loops can be implemented with the number of sources and the CIC. The number of feedback loops can provide automated feedback to the number of sources. The number of feedback loops can also include the number of consumers. Thus, the feedback loop can include the CIC, the number of sources, and the number of consumers. The number of feedback loops can provide feedback information to the number of sources based on feedback of the number of consumers of the CIC.

The feedback loop information can be valuable to the number of sources and the CIC. For example, the feedback loop can help identify sources that are compromised. For example, a known source (e.g., a source that is known to be a source for intelligence information, etc.) can be compromised by malicious security threat events and provide false intelligence information. The feedback loop can help the CIC identify compromised sources and automatically ignore intelligence information from the compromised source. The operator can execute a manual ignore of the compromised source and/or the source fidelity score can decrease to the point that the fidelity score is below a predetermined threshold and therefore can be an automatic ignore.

Figure 4:
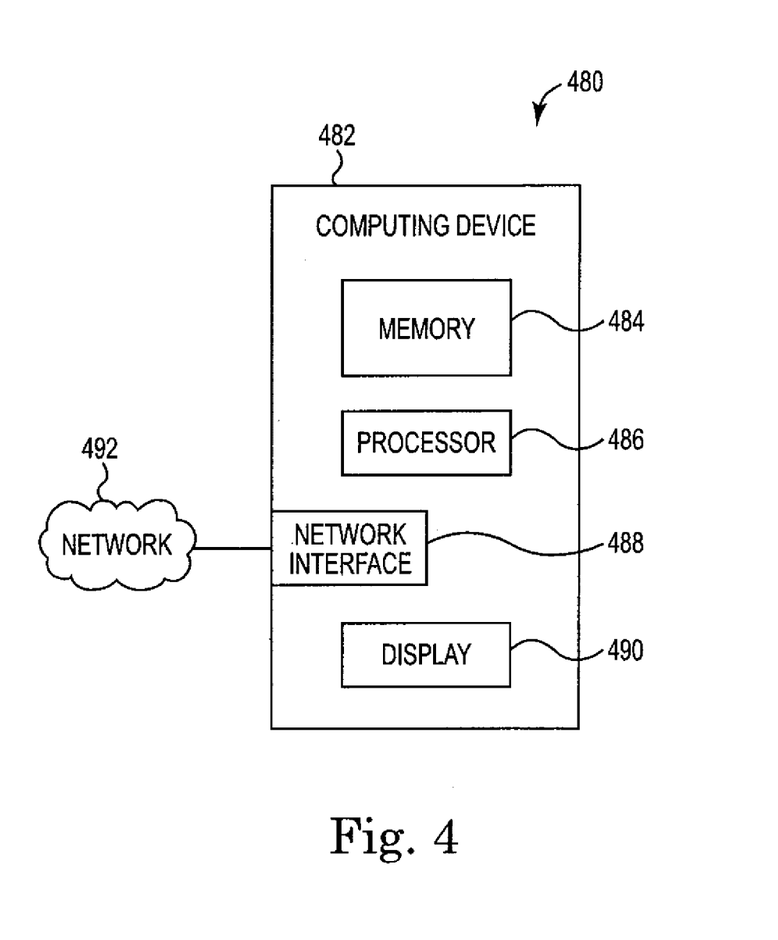
FIG. 4 illustrates an example computing device that can be utilized with one or more embodiments of the present disclosure.

FIG. 4 illustrates an example computing system 480 that can be utilized with one or more embodiments of the present disclosure. Computing device 482 can be, for example, a laptop computer, a desktop computer, or a mobile device (e.g., a mobile phone, a personal digital assistant, etc.), among other types of computing devices.

The computing device 482 can include a memory 484 and a processor 486 coupled to memory 484. Memory 484 can be any type of storage medium that can be accessed by processor 486 to perform various examples of the present disclosure (e.g., generating analysis data, calculating fidelity scores, determining automatic block, providing feedback to sources, etc.). For example, memory 484 can be a non-transitory computing device readable medium having computing device readable instructions (e.g., computing device program instructions, machine readable instructions, computer readable instructions, etc.) and data stored thereon. The computing device readable instructions are executable by processor 486 to perform various examples of the present disclosure. The data can be used (e.g., analyzed by) the computing device readable instructions during their execution.

Memory 484 can be volatile or nonvolatile memory. Memory 484 can also be removable (e.g., portable) memory, or non-removable (e.g., internal) memory. For example, memory 484 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 484 is illustrated as being located in computing device 482, embodiments of the present disclosure are not so limited. For example, memory 484 can, in addition to or alternatively, be located internal to another computing resource (e.g., enabling computer readable instructions to be downloaded over the Internet or another wired or wireless connection).

The computing device 482 can include a network interface 488. Network interface 488 can connect the computing device 482 to a network, such as network 492 illustrated in FIG. 4.

Network 492 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 492) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 492 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

The computing device 482 can also include a display 490. Display 490 can include, for example, a screen that can provide (e.g., display and/or present) information to a user of computing device 482.

Additionally, computing device 482 can receive information from the user of computing device 482 through an interaction with the user via display 490. For example, computing device 482 can receive input from the user via display 490 (e.g., a touch screen display or via another user input device such as a keyboard in response to interaction with items show on the display). For example, the user can enter the input into computing device 482 using, for instance, a mouse and/or keyboard associated with computing device 482 (e.g., display 490).

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things. For example, "a number of sources" can refer to one or more sources.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed:

1. A computer implemented method for providing a cyber intelligence clearinghouse executed by at least one processor, the method comprising:

determining, by the at least one processor, a source fidelity score associated with a cyber-security intelligence source, the source fidelity score being generated based on an analysis of intelligence information received from the cyber-security intelligence source including a number of security threat events that have previously been confirmed to be associated with actual cyber-attacks based on the intelligence information received from the cyber-security intelligence source, wherein the source fidelity score represents a trustworthiness of the cyber-security intelligence source with regard to intelligence provided by the cyber-security intelligence source;

determining, by the at least one processor, to block a new security threat event based on:
- new intelligence information received from the cyber-security intelligence source that predicts at least how an attack of the new security threat event may be performed based on patterns identified in the intelligence information, and
- the source fidelity score of the cyber-security intelligence source; and providing, over a network, feedback data to the cyber-security intelligence source, the feedback data comprising an indication that at least a portion of the new security threat event was successfully blocked by a security application based on the new intelligence information.

2. The method of claim 1, further comprising:
- determining, based on the source fidelity score, an event fidelity score associated with the new security threat event, wherein the event fidelity score represents a trustworthiness of the associated security threat event; and
- alerting, through a display, a user when the event fidelity score is within a predetermined threshold.

3. The method of claim 2, wherein the new security threat event is automatically blocked if the event fidelity score is above the predetermined threshold.

4. The method of claim 1, further comprising generating a timeline, via a cyber intelligence clearinghouse (CIC) engine, of received intelligence information and corresponding analysis data.

5. The method of claim 4, further comprising storing, within the CIC engine, the timeline for a longer period of time than the analysis data and intelligence information.

6. The method of claim 1, further comprising executing, via a CIC engine, a number of feedback loops, wherein a particular one of the number of sources is cross-analyzed against a remaining number of sources.

7. The method of claim 1, further providing a number of source fidelity scores to a corresponding source and providing feedback to the corresponding source on the intelligence information collected.

8. The method of claim 1, wherein the source fidelity score is generated based on the number of security threat events that have previously been confirmed to be associated with actual cyber-attacks based on the intelligence information received from the cyber-security intelligence source compared with a number of security threat events that have been reported by the cyber-security intelligence source.

9. The method of claim 1, wherein the feedback information is usable by the cyber-security intelligence source to refine intelligence provided by the cyber-security intelligence source.

10. A non-transitory computer-readable medium storing a set of instructions executable by a processor to cause a computer to:
- determine a source fidelity score associated with a cyber-security intelligence source, the source fidelity score being generated based on an analysis of intelligence information received from the cyber-security intelligence source including a number of security threat events that have previously been confirmed to be associated with actual cyber-attacks based on the intelligence information received from the cyber-security intelligence source, wherein the source fidelity score represents a trustworthiness of the cyber-security intelligence source with regard to intelligence provided by the cyber-security intelligence source;
- determine to block a new security threat event based on:
  - new intelligence information received from the cyber-security intelligence source that predicts at least how an attack of the new security threat event may be performed based on patterns identified in the intelligence information, and
  - the source fidelity score of the cyber-security intelligence source; and
- provide, over a network, feedback data to the cyber-security intelligence source, the feedback data comprising an indication that at least a portion of the new security threat event was successfully blocked by a security application based on the new intelligence information.

11. The medium of claim 10, wherein the instructions are executable to cause the computer to determine, based on the source fidelity score, an event fidelity score associated with the new security threat event, wherein the event fidelity score represents a trustworthiness of the associated security threat event.

12. The medium of claim 10, wherein the instructions are executable to cause the computer to provide analysis data based upon the new intelligence information, the analysis data including identify information of an actor responsible for the new security threat event, and
- wherein a domain name, an email address, and a physical address within the identity information are utilized to determine an identity pattern, wherein the identity pattern can be utilized to predict future domain names of the actor.

13. The medium of claim 11, wherein the event fidelity score further includes a security event data type that identifies a particular method of the security threat event.

14. The medium of claim 10, wherein the feedback data includes security event data from a first source compared to security event data from a second source.

15. The medium of claim 10, wherein feedback data includes a percentage of intelligence information confirmed to be malicious.

16. A system comprising a processor in communication with a non-transitory computer readable medium, wherein the non-transitory computer readable medium includes a set of instructions that when executed by the processor cause the processor to:
- determine a source fidelity score associated with a cyber-security intelligence source, the source fidelity score being generated based on an analysis of intelligence information received from the cyber-security intelligence source including a number of security threat events that have previously been confirmed to be associated with actual cyber-attacks based on the intelligence information received from the cyber-security intelligence source, wherein the source fidelity score represents a trustworthiness of the cyber-security intelligence source with regard to intelligence provided by the cyber-security intelligence source;
- determine to block a new security threat event based on:
  - new intelligence information received from the cyber-security intelligence source that predicts at least how an attack of the new security threat event may be performed based on patterns identified in the intelligence information, and
  - the source fidelity score of the cyber-security intelligence source; and provide, over a network, feedback data to the cyber-security intelligence source, the feedback data comprising an indication that at least a portion of the new security threat event was successfully blocked by a security application based on the new intelligence information.

17. The system of claim 16, wherein the alert is sub-tiered to notify a particular number of users based on the fidelity score.

18. The system of claim 16, further comprising instructions executable by a processor to determine if a source is compromised.

19. The system of claim 18, wherein intelligence information from the compromised source is automatically ignored.

20. The system of claim 16, further comprising instructions executable by the processor to determine identity information from the analysis data and utilize the identity information to search for possible malicious domains.

* * * * *